H. L. WILLIAMS.
MEANS TO PREVENT TANKS FROM BURSTING BY FREEZING.
APPLICATION FILED JAN. 27, 1917.
1,238,610.
Patented Aug. 28, 1917.
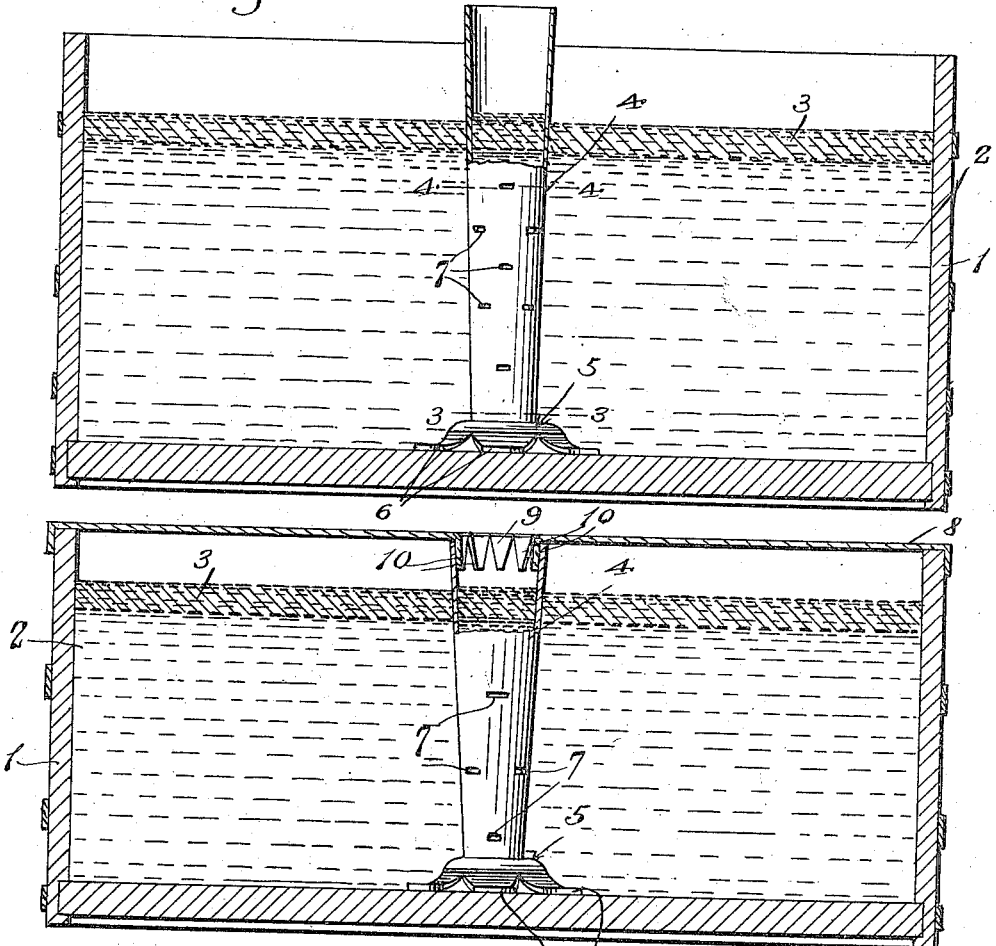
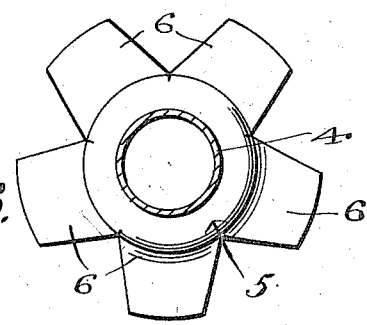
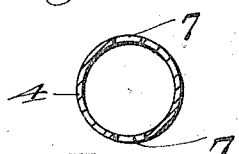
Inventor
H. L. Williams.
Witnesses

UNITED STATES PATENT OFFICE.

HENRY L. WILLIAMS, OF CAMDEN POINT, MISSOURI.

MEANS TO PREVENT TANKS FROM BURSTING BY FREEZING.

1,238,610. Specification of Letters Patent. Patented Aug. 28, 1917.

Application filed January 27, 1917. Serial No. 144,864.

*To all whom it may concern:*

Be it known that I, HENRY L. WILLIAMS, a citizen of the United States, residing at Camden Point, in the county of Platte and State of Missouri, have invented certain new and useful Improvements in Means to Prevent Tanks from Bursting by Freezing; and I do hereby declare the following to be a full, clear, and exact description of the invention, such as will enable others skilled in the art to which it appertains to make and use the same.

This invention relates to improvements in a device of that nature designed to be associated, during cold weather, with a tank containing a freezable liquid, and which consists of a hollow body adapted to admit a portion of the liquid at the lower end of the tank, and an object of the invention is to provide a device of this character that is of simple and durable construction, can be cheaply manufactured, will be efficient in operation and can be conveniently and expeditiously associated with any type of tank.

Other objects will appear and be better understood from that embodiment of my invention of which the following is a specification, reference being had to the accompanying drawings forming a part thereof, in which:

Figure 1 is a vertical sectional view, taken through a tank equipped with a device constructed in accordance with my invention, the mentioned device being partially shown in section, Fig. 2 is a vertical sectional view, taken through a tank provided with a cover, the latter having an opening therein with inwardly extending means for engaging within the upper end of the pressure relieving device, the said pressure relieving device being partially shown in section, Fig. 3 is a section, taken on the line 3—3 of Fig. 1, and Fig. 4 is a section taken on the line 4—4 of Fig. 1.

Referring to the drawings in detail, the numeral 1 indicates a tank of suitable construction and shown filled with liquid designated 2, the upper portion of the liquid having ice, designated 3, formed thereon. The device for relieving the pressure within the body of water within the lower portion of the tank, when ice is formed on the upper portion of the liquid, consists of an inverted frusto-conical shaped body 4 that is positioned within the tank and has the lower end thereof provided with a supporting base 5, which has a central raised portion located in spaced relation with the bottom wall of the tank, and a plurality of downwardly and outwardly extending spaced supporting legs 6, which are adapted to be secured to the bottom wall of the tank in any suitable manner. The opposite ends of the body 4 are open, and the central portion of the base 5 has an opening therein which communicates with the lower end of the body 4, and which establishes communication between the interior of the tank and the interior of the body 4. The body 4 is provided at spaced points with openings 7, which permit of the passage of liquid from the tank 2 into the interior of the body 4. When the body 4 is placed within the liquid in the tank, a portion of the liquid will enter the interior of the body through the lower end thereof and through the opening 7, the liquid within the body rising to the level of the liquid in the tank. When ice is forced on the upper surface of the liquid in the tank, and on the upper surface of the liquid in the body 4, the internal pressure created will displace upwardly the ice in the body 4, thus reducing the pressure to such an extent as to prevent the bursting of the tank. The operation just described will result in pressure, on the walls of the tank, being reduced and rupture of the same prevented.

In Fig. 1 of the drawings, the upper end of the body 4 is shown extending above the upper end of the tank 1, and in Fig. 2 of the drawings the upper end of the body 4 is shown terminating substantially in the same plane as the upper end of the tank 1, and a cover 8 is mounted on the upper end of the tank 1, as shown in Fig. 2, and is provided with an opening 9, which registers with the upper end of the body 4, a plurality of inwardly extending fingers 10 being carried by the wall of the opening 9 and extending into the upper end of the body 4. By virtue of having the fingers 10 extend into the upper end of the body 4, the said body 4 will be held against lateral movement, thereby overcoming the necessity of anchoring the supporting legs 6 to the lower wall of the tank 1.

It is evident that various changes might be resorted to in the construction, form and arrangement of the several parts without departing from the spirit and scope of the invention as claimed.

Having thus described my invention what I claim as new, is:

1. The combination with a tank, of a vertically disposed hollow body located within the tank and having its opposite ends open, the lower end of the body being spaced from the lower wall of the tank, a cover for the tank and provided with an opening registering with the open upper end of the body, and a plurality of inwardly extending elements carried by the wall of the opening in the cover and extending into the upper end of the hollow body.

2. A device to prevent a tank from bursting by freezing comprising an upwardly flaring hollow member located within the tank in open communication therewith, and the member having its upper end open to permit the ice formed therein to be displaced upwardly by the pressure created within the tank on the freezing of its contents, whereby to relieve such a pressure so as to prevent the bursting of the tank.

3. A device to prevent a tank from bursting by freezing comprising a substantially inverted frusto-conical shape body located within the tank in open communication therewith, and the body having its upper end open to permit the ice formed therein to be displaced upwardly by the pressure created within the tank on the freezing of its contents, whereby to relieve such pressure so as to prevent the bursting of the tank.

4. A device to prevent a tank from bursting by freezing comprising a substantially inverted frusto-conical shape body having openings therein and located within the tank in open communication therewith, and the body having its upper end open to permit the ice formed therein to be displaced upwardly by the pressure created within the tank on the freezing of its contents, whereby to relieve such pressure so as to prevent the bursting of the tank.

5. A device to prevent a tank from bursting by freezing comprising a vertically disposed and upwardly flaring hollow body located within the tank in open communication therewith and having its opposite end open, a base carried by the lower end of the body and including a centrally raised portion arranged in spaced relation with the lower wall of the tank, and a plurality of outwardly and downwardly extending fingers carried by the base and resting on the lower wall of the tank, and the body having its upper end open to permit the ice formed therein to be displaced upwardly by the pressure created within the tank on the freezing of its contents, whereby to relieve said pressure so as to prevent the bursting of the tank.

In testimony whereof I affix my signature in presence of two witnesses.

HENRY L. WILLIAMS.

Witnesses:
W. K. BYWATERS,
T. M. BAUGHMAN.

Copies of this patent may be obtained for five cents each, by addressing the "Commissioner of Patents, Washington, D. C."